Aug. 16, 1927. 1,638,847
F. F. HANSEN
SHUTTER COVER FOR RADIATORS
Filed Sept. 7, 1926
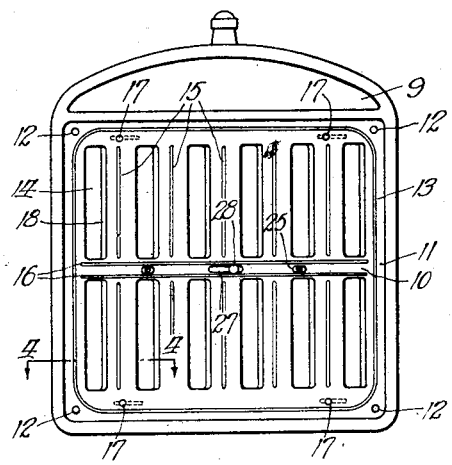
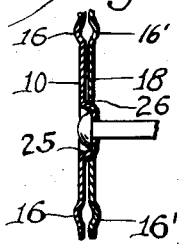
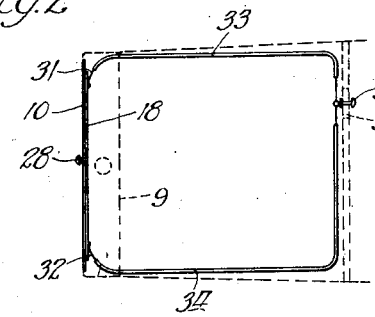
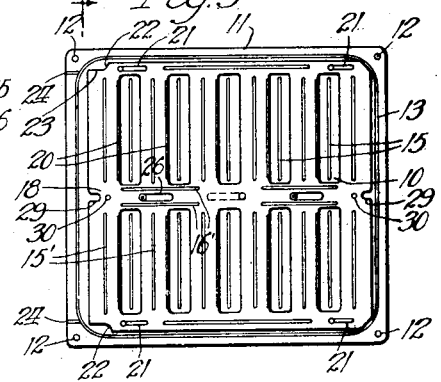
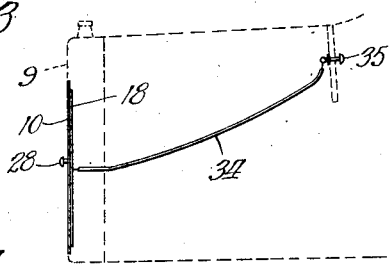
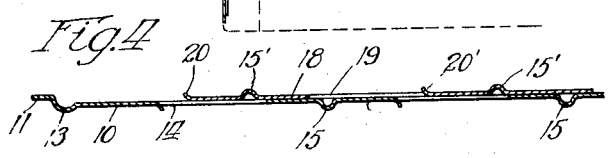
Inventor
Francis F. Hansen Patented Aug. 16, 1927.

1,638,847

UNITED STATES PATENT OFFICE.

FRANCIS F. HANSEN, OF CHICAGO, ILLINOIS, ASSIGNOR TO STAR SHUTTER COMPANY, OF CHICAGO, ILLINOIS, A CORPORATION OF ILLINOIS.

SHUTTER COVER FOR RADIATORS.

Application filed September 7, 1926. Serial No. 133,935.

My invention relates to an improvement in shutter covers for radiators of automobiles one object of which is to provide a shutter cover that is very thin so that it will not project outwardly from the radiator to any appreciable extent.

Another object of my invention is to provide a shutter cover with novel means for preventing the shutter members from becoming locked against sliding by the exposed edges striking against each other.

A further object of my invention is to provide improved means for operating the shutter whereby it may be opened or closed either from within the automobile or by a person standing in front of the automobile.

More particularly it is a purpose of my invention to provide a thin, easily operated shutter cover for automobile radiators which may be readily attached thereto, which is sufficiently strong to withstand the rough usage it will get when applied to the radiator and which may be manufactured at a comparatively low cost with a minimum number of parts.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications as would occur to a person skilled in this art and as would fall within the scope of the claims.

In the drawings:

Fig. 1 is a front view of the shutter attached to a radiator;

Fig. 2 is a diagrammatic plan view showing the means for operating the shutter from the dash board of the automobile;

Fig. 3 is a side view of the structure shown in Fig. 2;

Fig. 4 is an enlarged fragmentary section taken on the line 4—4 of Fig. 1;

Fig. 5 is a side view showing the opposite side of the shutter from that shown in Fig. 1; and Fig. 6 is a sectional view taken on the line 6—6 of Fig. 5.

Fig. 7 is a detail section showing the instruck portions on the stationary plate.

Referring now in detail to the drawings, the numeral 9 indicates the radiator of the automobile having a stationary plate 10 with a laterally offset rim 11 secured to the radiator by the bolts 37 extending through the opening 12 provided in the outer rim portion 11 of the plate 10. Extending around the plate 10 at the inner edge of the rim portion 11 is the reenforcing bead 13 which is struck up from the plate 10. The plate 10 has a series of slots or apertures 14 extending through the face thereof which are separated by webs of material of greater width than the width of the slots. Extending lengthwise of the webs between the slots 14 are the reenforcing ribs 15 struck up from the material of the plate 10. Reenforcing ribs 16 are also provided between the upper and lower series of slots 14.

The plate 10 has pins 17 riveted or otherwise secured thereto and projecting inwardly toward the radiator. Two of these pins are shown in Fig. 1 as being located at the top of the plate 10 and two being located at the bottom of the plate 10 at spaced points thereon. Slidably mounted on the pins 17 is the plate 18 having slots 21 therein through which the pins 17 extend. This plate 18 has slots 19 therein corresponding in number and size to the slots 14 in the plate 10.

One of the vertically extending edges 20 of the plate 18 is bent away from the plate 10 as is shown clearly in Fig. 4 to prevent engagement of the sharp edges of the plate 10 around the slots 14 with the edge 20 and the resultant locking against movement of the plate 18. Certain of the edges 20′ surrounding the apertures 19 in the plate 18 are also bent away from the plate 10 for a similar purpose. The plate 18 is also provided with reenforcing ribs 15′ and 16′ as clearly shown in Figs. 4 and 5, for stiffening the same.

The end of the plate 18 opposite the laterally deflected portion 20 has shoulders 22 thereon and an extended portion 23 of less width than the body of the plate 18, the purpose of which will presently appear. The outer rim portion 11 of the plate 10 is laterally offset at the points 24 shown clearly in Figs. 5 and 6 to permit sliding of the end portion 23 between the rim portion and the radiator within certain limits. The distance of the offset at 24 is just sufficient to provide space enough for the sliding of the plate portion 23 therein without binding. In the body portion of the plate 10 there are provided in struck apertured portions 25 which extend inwardly toward the radiator a distance substantially equal to the thickness of the plate 18 which has slots 26 therein through which the portions 25 extend. Bolts similar to bolts 37 extend through the apertures in portions 25.

This structure provides a central guiding portion for the slidable plate 18 in addition to the guiding and supporting slots 21. In the central portion of the plate 10 substantially half way between the side edges thereof is an elongated slot 27 in which the pin 28 secured to the plate 18 is slidable. The pin 28 extends slightly beyond the plate 10 and has a head thereon to serve as an operating handle for opening and closing the shutter. On opposite side edges of the plate 18 there are provided cut out portions 29 and spaced inwardly from these portions are the openings 30 through which the wires 31 and 32 may be extended and fastened to the plate 18. These wires 31 and 32 extend through the tubes 33 and 34 which may be a small metal pipe and which are curved about to fit along side of the housing or hood of the car and extend backwardly to the dash board.

On the dash board there is provided a slot 36 in which a pin 35 is mounted, this pin being connected to the wires 31 and 32 to provide a simple and effective means for opening and closing the shutter from within the car. Bolts 37 for securing the plate 10 to the radiator may have a washer 38 of fiber or soft metal or other material thereon to engage the inner side of the radiator, and wing nuts 39 are provided for holding the bolts 37 in place.

The plates 10 and 18 of the shutter are of thin sheet metal which enables the construction of this device so that it will occupy a minimum amount of space. The reenforcing ribs provided make the structure sufficiently strong and rigid to stand the jars and rough uses to which it is subjected without adding additional weight thereto.

The provision of the portions 25 which serve as a support for plate 18 as well as a means for securing the central portion of plate 10 to the radiator also prevent buckling or rattling of the plates at the center.

Having thus described my invention, what I desire to claim and secure by United States Letters Patent is:

1. A shutter for automobile radiators comprising a thin sheet metal plate having a plurality of elongated slots therein and a laterally offset outer edge adapted to be secured against the radiator, a second sheet metal plate between said first named plate and the radiator and slidably secured to said first named plate, said first named plate having an in-struck apertured portion adjacent the center thereof whereby the central portion thereof may be directly secured to the radiator front, said second plate having elongated slots therein adapted to be moved into and out of alignment with said first named slots by sliding said second plate, and said second plate having an opening therethrough elongated in the direction in which said second plate slides, and receiving the said in-struck apertured portion on said first named plate.

2. A shutter for automobile radiators comprising a pair of thin parallel plates, one plate having means thereon for securing it to the radiator, the other plate being slidably secured to the first named plate, said plates having elongated slots therein and webs of material of greater width than said slots therebetween, certain of said webs having one edge thereof curved outwardly to facilitate sliding movement between said plates.

3. A shutter for automobile radiators comprising a pair of thin parallel plates, one plate having a laterally offset outer rim portion and means on said rim portion for securing it to the radiator, and having in-struck apertured portions spaced inwardly from said rim portion for rigidly securing the central portion thereof directly against the radiator, the other plate being slidably secured to the first named plate inside said rim portion and having apertures therein through which said in-struck portions extend, said plates having elongated slots therein and webs of material of greater width than said slots therebetween, certain of said webs having one edge thereof curved outwardly to facilitate sliding movement between said plates.

4. A shutter of the character described comprising a pair of thin metal plates, one plate having an outer rim portion three sides of which are laterally offset from said plate, a reenforcing bead along the inner edge of said rim portion and means on said rim portion for securing it to an automobile radiator, the other plate being slidably secured to the first named plate inside said rim portion and having one end adapted to extend beneath the side of said rim portion that is not offset, said plates having elongated slots therein and webs of material of greater width than said slots therebetween one edge of said slidable plate and one edge of each of the webs therein being curved away from the stationary plate to facilitate sliding movement between said plates.

In witness whereof, I hereunto subscribe my name this 20th day of August, A. D. 1926.

FRANCIS F. HANSEN.